April 9, 1968

B. BARÉNYI ET AL 3,376,947

INSTRUMENT PANEL

Filed Nov. 23, 1965

INVENTORS.
BÉLA BARÉNYI
HEINRICH HASELMANN

BY *Dicke + Craig*

ATTORNEYS

April 9, 1968     B. BARÉNYI ET AL     3,376,947
INSTRUMENT PANEL

Filed Nov. 23, 1965     3 Sheets-Sheet 2

INVENTORS.
BÉLA BARÉNYI
HEINRICH HASELMANN

BY Dicke & Craig
ATTORNEYS

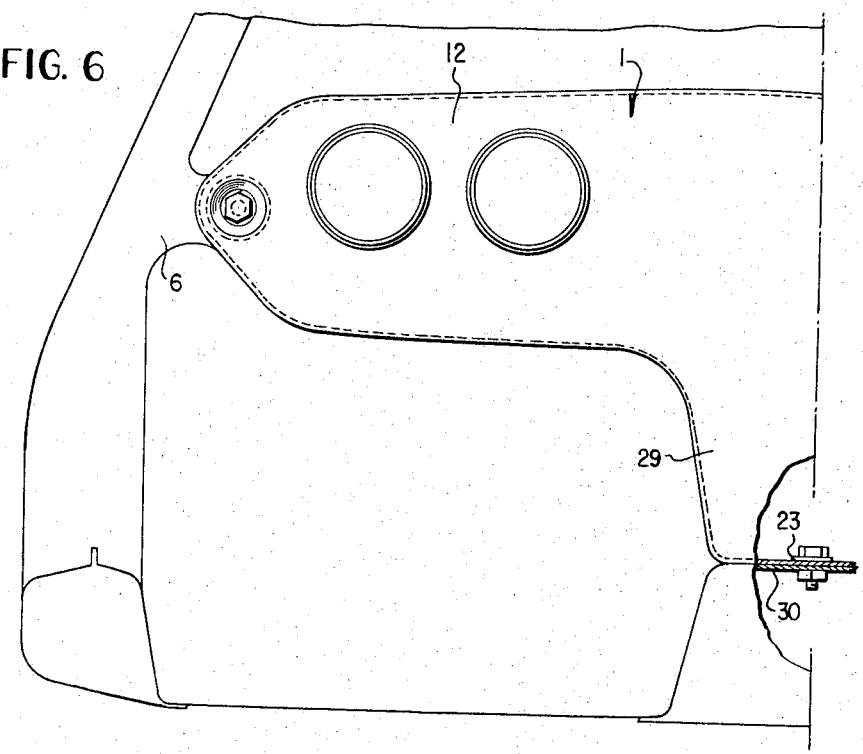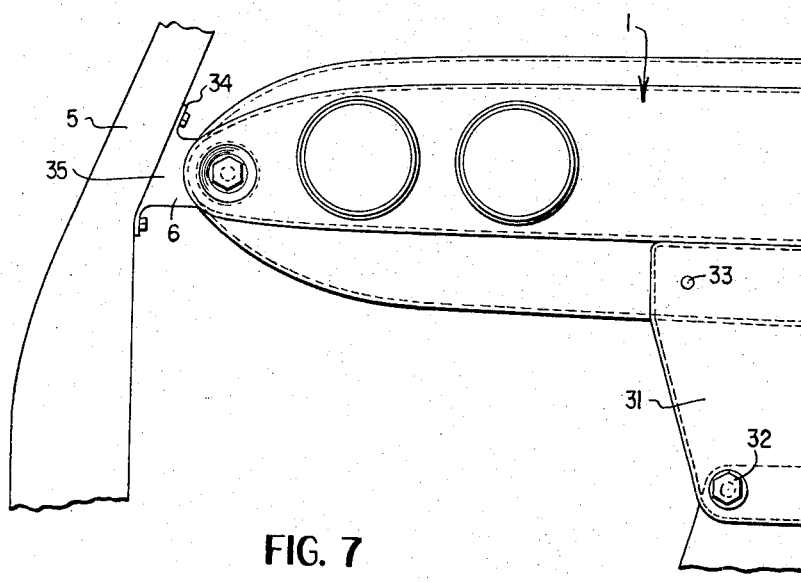

United States Patent Office 3,376,947
Patented Apr. 9, 1968

3,376,947
INSTRUMENT PANEL
Béla Barényi, Stuttgart-Vaihingen, and Heinrich Haselmann, Sindelfingen, Wurttemberg, Germany, assignors to Daimler-Benz Aktiengesellschaft, Stuttgart-Untertürkheim, Germany
Filed Nov. 23, 1965, Ser. No. 509,343
Claims priority, application Germany, Nov. 27, 1964, D 45,928
19 Claims. (Cl. 180—90)

ABSTRACT OF THE DISCLOSURE

An instrument panel for a motor vehicle, affording maximum protection to passengers from injuries caused by impact with said panel, wherein the panel is resilient and is mounted at a distance from the lower edge of the windshield, being free of any connection with said edge, the panel being secured, at the lateral ends thereof, to an area constituting the door columns or the like, the securing surfaces being disposed approximately in the transverse direction of the vehicle, and connected to brackets at said door columns or the like by readily detachable bolts or rivets disposed in the longitudinal direction of the vehicle, thus effecting a frictional contact. The securing surfaces at opposite ends of the panel may be disposed in a common plane. An additional securing surface may be provided within the area of the tunnel. Further, the panel may be arranged to overlap, without being secured to, a deformable sheet metal part provided along the lower edge of the windshield.

---

The present invention relates to a yieldingly constructed instrument panel for motor vehicles which satisfies the requirement as regards safety.

The known instrument panels are provided in part with padding structures which, however, are unable to absorb any energy during impact. On the other hand, instrument panels have already been proposed heretofore which are yielding to a certain extent. The prior art instrument panels, however, are as a rule in some connections with the supporting frame formed under the windshield of the vehicle so that in case of accidents they cannot yield to a sufficient extent in the vehicle longitudinal direction. Additionally, it has been proposed already in German application D 44,296, filed in the name of the assignee of the present application, to constitute the instrument panel yieldingly in the direction of the steering column, and it was already indicated schematically in the drawing in this application that the instrument panel is arranged at a certain distance to the rear of the windshield and is not connected with the supporting frame of the windshield over the entire width. This arrangement offers the advantage that the instrument panel, especially in its center, and within the area directly in front of the driver and the passengers of the front seats, is able to carry out a large deformation path in case of accidents. Furthermore, in this prior application, it was shown that the instrument panel may be provided with securing flanges whose abutment surfaces are disposed approximately in the longitudinal direction of the vehicle, i.e., between the door columns or the like. This constructions, however, requires a very accurate tolerance in the length of the instrument panel in order that it can be fitted accurately between the door columns. Furthermore, the securing means for example, screws, or the like are stressed essentially in the axial direction thereof during deformation of the instrument panel. A frictional contact between the flange and the door column or the like is not established.

The present invention is concerned with the task to construct an instrument panel which is yielding to a considerable extent as well as shock absorbing and energy absorbing, whereby its securing can be realized without after finishing operations even with large manufacturing tolerances.

The present invention essentially consists in that the instrument panel is arranged freely supported at a distance from the lower edge of the windshield and its securing surfaces, disposed at the lateral ends thereof within the area of the door columns or the like, are disposed approximately in the vehicle transverse direction. Upon impact of body parts of the passengers in case of accidents, the instrument panel which is disposed at a distance from the windshield is able to yield considerably in the driving direction. The lateral securing surfaces disposed in the vehicle transverse direction then enable a displacement of the instrument panel with respect to the eyes or the like, arranged at the door columns or the like.

According to a further, advantageous development of the present invention, the instrument panel may be secured at the securing surfaces in a readily detachable manner establishing a frictional contact, preferably by means of bolts or also rivets or other clamping means disposed approximately in the vehicle longitudinal direction. The friction surfaces which are pressed one upon the other by the securing means, effect during yielding of the instrument panel in the vehicle longitudinal direction a considerable frictional damping which, together with the deformation work, leads to the dissipation of the impact energy.

The abutment surfaces may be disposed advantageously parallel to the instrument panel main surface whereby a very favorable manufacturing possibility results if they are in a single plane. The instrument panel according to the present invention may also be provided with an additional securing place within the area of the tunnel. This additional securing place imparts to the instrument panel a higher rigidity transversely to the steering column also in its central part and enables nevertheless yielding in the vehicle longitudinal direction as its acts like a joint about which the instrument may be pivoted. This additional securing place and the parts leading thereto enable in an advantageous manner the accommodation of instruments, radios, glove compartments or the like within an area in which the passengers do not impinge during the most frequently recurring, serious accidents; namely, collision accidents. These instruments or spaces may thus be displaced out of the area directly in front of the passengers into which the head of the passenger impinges for the most part. According to still a further advantageous development of the present invention, the instrument panel may overlap a yielding sheet metal part disposed within the area of the lower edge of the windshield—while avoiding a connection therewith—in order to deform the sheet metal part upon impact on the same in case of accidents whereby the instrument panel has already traversed beforehand a considerable deformation path.

Accordingly, it is an object of the present invention to provide a safety instrument panel which is simple in construction yet avoids the aforementioned shortcomings and drawbacks encountered with the prior art constructions.

It is another object of the present invention to provide a safety instrument panel which is capable of yielding in the vehicle longitudinal direction thus minimizing the danger of injuries to passagers in case of accidents.

A further object of the present invention resides in a safety instrument panel for motor vehicles which is not only able to yield readily in case of impacts by body parts of passengers during accidents but which is additionally able to absorb large amounts of impact energy.

A still further object of the present invention resides in the provision of a safety instrument panel for passenger motor vehicles which obviates the need for accurate manufacturing requirements and small tolerances ordinarily necessitated for properly installing and fitting the instrument panel into the vehicle during assembly thereof.

Another object of the present invention resides in a shock-absorbing and energy-absorbing instrument panel for passenger motor vehicles which is relatively simple in construction, may be readily manufactured and installed, and involves relatively small expenditures to bring about these features.

These and further objects, features, and advantages of the present invention will become more obvious from the following description when taken in connection with the accompanying drawing, which shows, for purposes of illustration only, several embodiments in accordance with the present invention, and wherein:

FIGURE 6 is a partial elevational view through a third embodiment of an instrument panel in accordance with the present invention, similar to FIGURE 1, and FIGURE 7 is a partial elevational view, similar to FIGURE 1, of a fourth embodiment of an instrument panel in accordance with the present invention.

Figure 1:
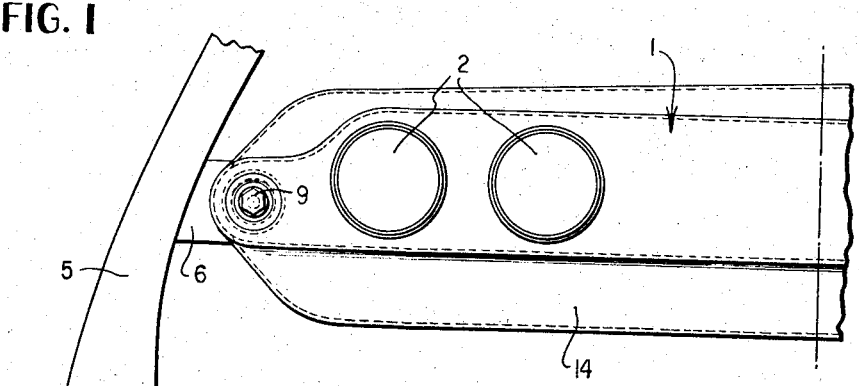
FIGURE 1 is an elevational view of an instrument panel in accordance with the present invention, rotated by about 15° into the plane of the drawing.
Figure 2:
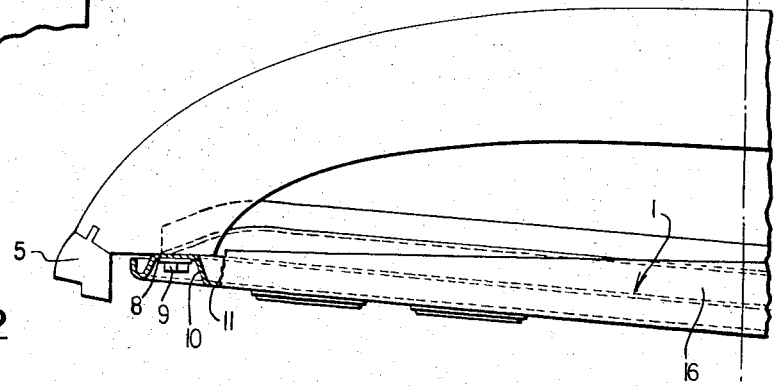
FIGURE 2 is a top plan view of the instrument panel of FIGURE 1, rotated by 15° from its actual installation position.
Figure 3:
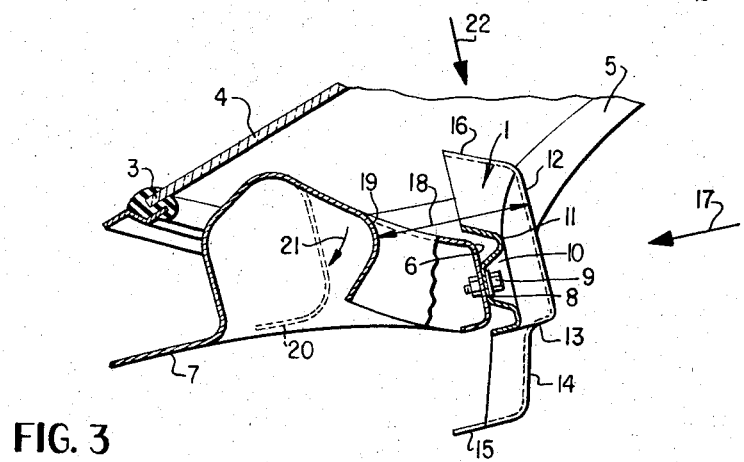
FIGURE 3 is a cross-sectional view through the instrument panel of FIGURES 1 and 2, taken along the longitudinal center line.

Referring now to the drawing wherein like reference numerals are used throughout the various views to designate like parts, and more particularly to FIGURES 1 to 3, reference numeral 1 generally designates in this embodiment an instrument panel provided with instruments 2 of which only two are schematically illustrated. The instrument panel 1, as is particularly clearly visible from FIGURE 3, is arranged at a considerable distance from the lower edge 3 of the windshield 4. Within the area of the door columns 5 securing surfaces are provided disposed in the vehicle transverse direction, which in this case are the ends of the sheet metal panel 7 extending below the windshield 4 and coming from the engine space, and more particularly at the places where the panel 7 passes over into the door columns 5. The instrument panel 1 is provided within the area of its two lateral ends with abutment surfaces 8 which abut flat against the securing surfaces 6 and are pressed thereon by means of screws or bolts 9. The screws or bolts 9 are located in a respective recess 10 whose rim 11, drawn considerably beyond the bolt head, assures that in case of accidents the passengers do not strike the bolt heads.

The instrument panel is constructed of large surface whereby its main surface 12 is inclined at an angle of about 15° to the vertical (FIGURE 3). The main surface 12 is provided at the bottom thereof with an off-set or step 13 which is, in turn, adjoined by the surface 14. The surface 14 passes over into the leg portion 15. The leg portion 16 is bent-off at the upper end of the surface 12. The instrument panel thus has in its main part the basic shape of a horizontally resting U with short leg portions.

As may be seen particularly well from FIGURE 2, the instrument panel 1 extends within its main area located in front of the passengers at a considerable distance from the lower edge 3 of the windshield 4. Consequently, the instrument panel 1 can readily deform in case of impact of passengers during accidents especially in the direction of the arrow 17 (FIGURE 3) whereby it bends through in the driving direction. A displacement of the abutment surfaces 8 with respect to the surfaces 6 results therefrom which are pressed one upon the other with frictional engagement and thus effect a frictional damping. Furthermore, this arrangement of the securing surface, which is disposed in a single plane with the other securing place located at the right door column, enables a completely satisfactory assembly also with larger tolerances in the length of the instrument panel 1, especially as the bolt 9 is arranged at a considerable distance from the respective door column 5 and a free space is left between the end of the instrument panel 1 and the door column 5 which does not cause large manufacturing tolerances and allowable variations to become noticeable. At least one of the bores through which the bolt 9 extends may be constructed as elongated aperture.

After the instrument panel 1 has been deformed over the distance of the double arrow 18, it strikes or impinges against the rearmost part of the panel 7 which is provided with a curvature 19 having a large radius and can be deformed in the direction of arrow 21 as indicated in dash lines whereby additional deformation work, lessening the impact, is absorbed. As a result thereof, injuries to the passengers are still further prevented.

In the direction of the arrow 22, the instrument panel 1 exhibits a considerably larger rigidity than in the direction of the arrow 17 so that the steering column and the like can also be supported completely satisfactorily at the instrument panel. The leg portions 15 and 16 prevent injuries of the passengers in case of an inclined or oblique impact of the heads or knees of the passengers.

Figure 4:
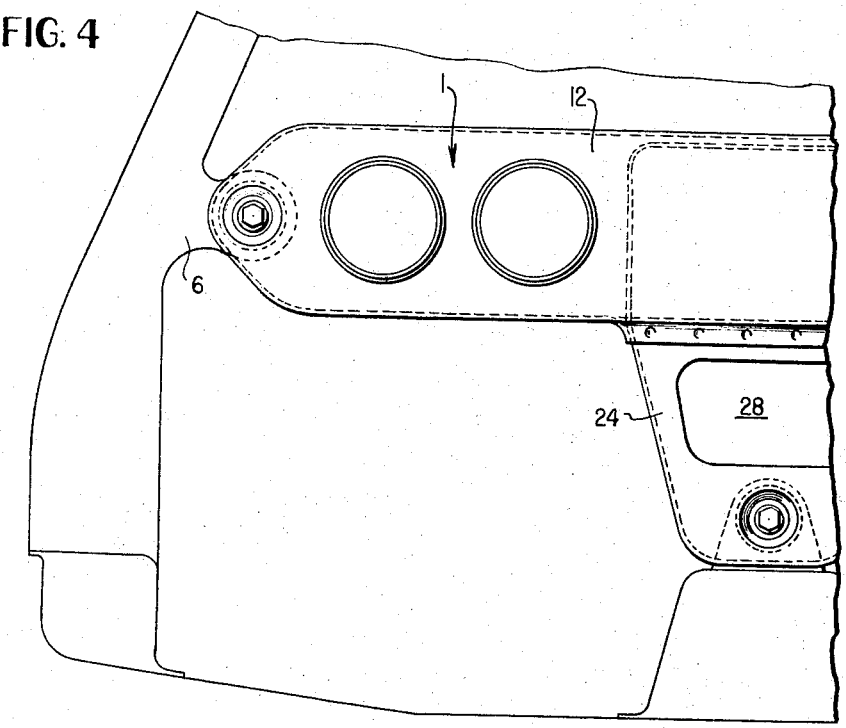
FIGURE 4 is a partial elevational view similar to FIGURE 1, of a second embodiment of an instrument panel in accordance with the present invention.
Figure 5:
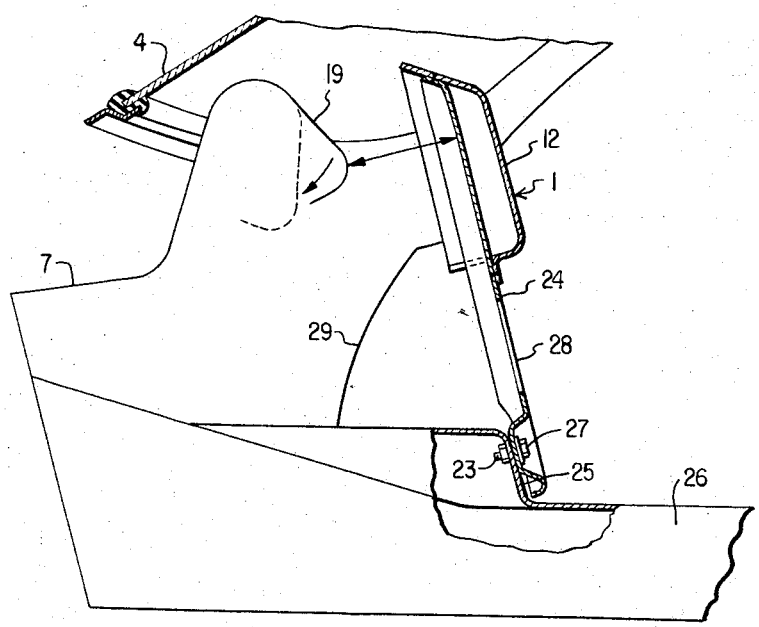
FIGURE 5 is a partial longitudinal cross-sectional view through the instrument panel of FIGURE 4, taken again along the longitudinal center line.

The mode of operation of the instrument panel according to FIGURES 4 and 5, is, in principle, the same as that described above with the embodiment of FIGURES 1 to 3, and most of the parts are also constructed in the same manner as in FIGURES 1 to 3. The same parts are thereby designated by the same reference numerals. Only a further sheet metal part 24 is welded on in the center at the inside of the instrument panel 1, which is constructed in its cross section without the step 13, whereby the further sheet metal part 24 leads to a further securing point 23. The abutment surface 25 is embossed out of the tunnel 26 and lies in the same plane as the abutment surfaces 6 so that no difficulties arise as regards assembly. A frictional engagement between the panel 24 and the tunnel 26 is also established in this case by the bolt or screw 27 which frictional engagement enables during deformation of the instrument panel a yielding or deflection of the panel 24 in the upward direction while absorbing frictional energy. As to the rest, the relatively low securing point 23 acts like a joint, about which the panel 24 is able to bend if the instrument panel 1 is displaced forwardly in the direction toward the windshield 4. This panel 24 then absorbs additional considerable deformation energy without impairing or influencing, in principle, the deformability of the instrument panel 1. An aperture 28 is provided in the supporting panel 24 which improves the stability of the instrument panel in the direction of the securing surfaces 2 and 25 considerably, which aperture 28 leads to a glove compartment or storage compartment for instruments covered by the rear wall 29.

The embodiment of FIGURE 6 differs from that of FIGURES 4 and 5 only in that the supporting part 29, leading to the tunnel-securing point 23, is formed in one piece with the instrument panel 1 and that the abutment surfaces 30 are disposed horizontally whereby, however, the joint function is rather improved than deteriorated.

The embodiment according to FIGURE 7 differs from the two last-described embodiments in that the supporting sheet metal panel 31 is provided with two securing points 32 whose abutment surfaces at the tunnel are located adjacent one another but again in the plane of the abutment surfaces 6. The supporting panel 31 is connected with the instrument panel 1 at 33 by bolts, screws, rivets or the like. The abutment surfaces 6 are not provided in this embodiment, as in the preceding embodiments with sheet metal parts constructed in one piece with the door columns 5 or connected therewith by welding, but are constructed as support brackets 35 provided with flanges 34. The securing surfaces of the flanges 34 at the support brackets 35 and at the door column 5 are disposed approximately in the vehicle longitudinal direction.

While we have shown and described several embodiments in accordance with the present invention, it is understood that the same is not limited thereto but is susceptible of numerous changes and modifications as known to person skilled in the art. For example, the instrument panel need not be rectilinear but may also be curved. The securing surfaces may then also be disposed in the direction of these curved surfaces. Thus, it is obvious that the present invention is not limited to the details shown and described herein but is susceptible of numerous changes and modifications as are encompassed by the scope of the appended claims.

We claim:

1. A safety instrument panel for motor vehicles having a windshield and relatively fixed support parts in the form of door columns, characterized in that said instrument panel is flexible and is arranged freely at a distance from the lower edge of the windshield and is provided with securing surface means at the lateral ends thereof within the area of said fixed support parts, said fixed support parts being disposed generally in the vehicle transverse direction.

2. The instrument panel according to claim 1, further comprising readily detachable means for fastening said securing surface means to said fixed support parts and establishing simultaneously a frictional engagement.

3. The instrument panel according to claim 2, wherein said instrument panel has a main panel and said securing surface means form abutment surfaces disposed substantially parallel to the main surface of the instrument panel.

4. The instrument panel according to claim 3, wherein said securing surface means are disposed in substantially a single plane.

5. The instrument panel according to claim 1, wherein said instrument panel has a main panel and said securing surface means form abutment surfaces disposed substantially parallel to the main surface of the instrument panel.

6. The instrument panel according to claim 1, wherein said securing surface means are disposed in substantially a single plane.

7. The instrument panel according to claim 6, further comprising a yielding sheet metal part located within the area of the lower edge of the windshield, said instrument panel freely overlapping said sheet metal part at a distance therefrom while avoiding any connection therewith.

8. The instrument panel according to claim 1, further comprising a yielding sheet metal part located within the area of the lower edge of the windshield, said instrument panel freely overlapping said sheet metal part at a distance therefrom while avoiding any connection therewith.

9. A safety instrument panel for motor vehicles having a windshield and relatively fixed support parts in the form of door columns, characterized in that said instrument panel is arranged freely at a distance from the lower edge of the windshield and is provided with securing surface means at the lateral ends thereof within the area of said fixed support parts, and said fixed support parts being disposed generally in the vehicle transverse direction, said securing surface means being disposed in substantially a single plane, wherein the motor vehicle includes a tunnel, and wherein said instrument panel is provided with means forming a further securing place within the area of said tunnel.

10. A safety instrument panel for motor vehicles having a windshield and relatively fixed support parts in the form of door columns, characterized in that said instrument panel is flexible and is arranged freely at a distance from the lower edge of the windshield and is provided with securing surface means at the lateral ends thereof within the area of said fixed support parts, and said fixed support parts being disposed generally in the vehicle transverse direction, said securing surface means being disposed in substantially a single plane, wherein the motor vehicle includes a tunnel, and wherein said instrument panel is provided with means forming a further securing place within the area of said tunnel.

11. The instrument panel according to claim 10, further comprising a yielding sheet metal part located within the area of the lower edge of the windshield, said instrument panel freely overlapping said sheet metal part at a distance therefrom while avoiding any connection therewith.

12. A safety instrument panel for motor vehicles having a windshield and relatively fixed vehicle parts, comprising resilient instrument panel means arranged freely at a considerable distance in the vehicle longitudinal direction from the lower edge of the windshield and provided with securing surface means at the lateral ends thereof within the area of said fixed parts, and means for connecting said instrument panel means to said fixed parts only at said securing surface means, said instrument panel constructed of a material which causes said panel to deform in the vehicle longitudinal direction upon impact in that direction.

13. The safety instrument panel according to claim 12, wherein said securing surface means are disposed in the generally transverse direction of the vehicle.

14. The instrument panel according to claim 13, further comprising readily detachable means for fastening said securing surface means with said fixed parts to establish a frictional engagement.

15. The instrument panel according to claim 12, further comprising readily detachable means for fastening said securing surface means with said fixed parts to establish a frictional engagement.

16. The instrument panel according to claim 12, wherein said securing surface means are disposed in substantially a single plane.

17. The instrument panel according to claim 12, further comprising yielding panel means located within the area of the lower edge of the windshield, said instrument panel means freely overlapping said panel means at a distance therefrom while avoiding any connection therewith.

18. A safety instrument panel for motor vehicles having a windshield and relatively fixed vehicle parts, comprising instrument panel means arranged freely at a considerable distance in the vehicle longitudinal direction from the lower edge of the windshield and provided with securing surface means at the lateral ends thereof within the area of said fixed parts, and means for connecting said instrument panel means to said fixed parts only at said securing surface means, wherein the vehicle includes a tunnel, and wherein said instrument panel means is provided with means forming a further securing place within the area of said tunnel.

19. The instrument panel according to claim 17, further comprising yielding panel means located within the area of the lower edge of the windshield, said instrument panel means freely overlapping said panel means at a distance therefrom while avoiding any connection therewith.

References Cited
UNITED STATES PATENTS

| | | | |
|---|---|---|---|
| 1,325,140 | 12/1919 | Carson | 180—90 |
| 2,070,760 | 2/1937 | Straith | 280—150 |
| 2,072,655 | 2/1937 | Tjaarda | 180—90 |
| 2,088,787 | 8/1937 | Gregorie | 180—90 X |
| 3,282,622 | 11/1966 | Komenda | 296—70 |

KENNETH H. BETTS, *Primary Examiner.*